United States Patent
Hickle et al.

(10) Patent No.: US 11,057,067 B1
(45) Date of Patent: Jul. 6, 2021

(54) SELF-INTERFERENCE SIGNAL CANCELLATION

(71) Applicant: BAE Systems Information and Electronic Systems Integration Inc., Nashua, NH (US)

(72) Inventors: Mark D. Hickle, Merrimack, NH (US); Robert W. Sepanek, Milford, NH (US); Mark E. Stuenkel, Goffstown, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/846,824

(22) Filed: Apr. 13, 2020

(51) Int. Cl.
  *H04B 3/20* (2006.01)
  *H04B 1/10* (2006.01)
  *H04L 5/14* (2006.01)

(52) U.S. Cl.
  CPC ............ *H04B 1/1081* (2013.01); *H04L 5/14* (2013.01)

(58) Field of Classification Search
  None
  See application file for complete search history.

(56) References Cited

U.S. PATENT DOCUMENTS

| | | | |
|---|---|---|---|
| 6,052,702 A | | 4/2000 | Berberidis et al. |
| 9,742,593 B2 * | | 8/2017 | Moorti ............... H04L 47/29 |
| 10,069,712 B2 | | 9/2018 | Qian et al. |
| 10,425,115 B2 * | | 9/2019 | Hahn ................ H04L 5/14 |
| 2011/0183622 A1 * | | 7/2011 | Apostolos ........... H04B 15/02 455/63.1 |
| 2015/0043685 A1 * | | 2/2015 | Choi ................. H04L 27/2691 375/346 |
| 2019/0181825 A1 * | | 6/2019 | Schmalzl ............. H03H 9/66 |

OTHER PUBLICATIONS

Ibrahim Sarah Adel, "RF Feedforward Interference Cancellation for Wide-band Signals using Adjustable Band-stop Resonators", Thesis submitted National University of Ireland Maynooth, Jun. 6, 2017, 204 pages.

Sabharwal, A., "In-Band Full-Duplex Wireless: Challenges and Opportunities", Sep. 2014, IEEE Journal on Selected Areas in Communications, vol. 32, 16 pages.

(Continued)

*Primary Examiner* — Phuongchau Ba Nguyen
(74) *Attorney, Agent, or Firm* — Finch & Maloney PLLC (57) ABSTRACT

Techniques are disclosed for self-interference signal cancellation. A hybrid self-interference cancellation (SIC) circuit is configured to be operatively coupled to a transmitter and a receiver, and includes a tunable time domain filter in series with a tunable frequency domain filter. The tunable time domain filter is configured to generate a time-domain multipath cancellation signal based on a first radio signal transmitted by the transmitter at a first frequency while the receiver is receiving a second radio signal at a second frequency. The first and second frequencies can be the same or different and have similar or different power levels at the antennas. The tunable frequency domain filter, which is in series with the tunable time domain filter, is configured to generate a frequency-domain cancellation signal based on the first radio signal while the receiver is receiving the second radio signal.

20 Claims, 12 Drawing Sheets

(56) References Cited

OTHER PUBLICATIONS

Kolodziej, K., "In-Band Full-Duplex Technology: Techniques and Systems Survey", Jul. 2019, IEEE Transactions on Microwave Theory and Techniques, vol. 67, 17 pages.
Krishnaswamy, H. et al., "Full-Duplex in a Hand-Held Device—From Fundamental Physics to Complex Integrated Circuits, Systems and Networks: An Overview of the Columbia FlexICoN Project", 2016, IEEE, 5 pages.
Kolodziej, K., "Multitap RF Canceller for In-Band Full-Duplex Wireless Communications", Jun. 2016, IEEE Transactions on Wireless Communications, vol. 15, 14 pages.
Kolodziej, K., "Photonic-Enabled RF Canceller for Wideband In-Band Full-Duplex Wireless Systems", May 2019, IEEE Transactions on Microwave Theory and Techniques, vol. 67, 11 pages.
Bharadia, D. et al., "Full Duplex Radios", Aug. 2013, SIGCOMM'13, AMC, 12 pages.
Jachowski, D., "Tunable Lumped-Element Notch Filter with Constant Bandwidth", 2010, IEEE, 4 pages.
Naglich, E. et al., "Switchless Tunable Bandstop-to-All-Pass Reconfigurable Filter", May 2012, IEEE Transactions on Microwave Theory and Techniques, vol. 60, 8 pages.
Tijani, S. and D. Manstretta, "A Low-Power Active Self-Interference Cancellation Technique for SAW-Less FDD and Full-Duplex Receivers", 2017, Journal of Low Power Electronics and Applications, MDPI, 17 pages.
Zhou, J. et al., "Integrated Wideband Self-Interference Cancellation in the RF Domain for FDD and Full-Duplex Wireless", IEEE Journal of Solid-State Circuits, Dec. 2015, vol. 50, 17 pages.
Zhou, Q. et al., "Fast Dynamic In-band RF Self-Interference Cancellation for Enabling Efficient Spectral Usage", National Science Foundation, 2017, 3 pages.

* cited by examiner

SELF-INTERFERENCE SIGNAL CANCELLATION

FIELD OF THE DISCLOSURE

This disclosure relates generally to the field of communication systems, and more particularly, to a self-interference cancellation (SIC) circuit for simultaneous transmit and receive (STAR) operation in wideband radio frequency (RF) systems.

BACKGROUND

Many communication systems, including modern military communications, electronic warfare (EW), radar systems, and cellular systems often have the need to simultaneously transmit and receive radio signals (STAR), which is also sometimes referred to as in-band full-duplex (IBFD). STAR is a method of communication in which transmitting and receiving is performed at the same center frequency at the same time. For example, some EW systems must be able to listen to a signal while jamming for 100% probability of intercepting adversarial signals. This requirement is very challenging because high-power signals from the transmit antenna can directly couple into the receive antenna at levels many orders of magnitude stronger than the signals of interest the receiver is intended to detect, an effect called self-interference. Self-interference of the transmit signal and the receive signal can, for example, damage or saturate the receiver if the transmit signal has sufficiently high power and there is low spatial (physical) isolation between the transmit and receive antennas. Furthermore, self-interference can de-sensitize the receiver and add spurious content to the receive signal if the transmit signal has moderate power and there is low spatial isolation between the antennas. Also, it can be difficult to distinguish low-power signals of interest when there is high-power leakage from the transmitter.

Solutions to the self-interference problem include isolating the transmit signal from the receive signal (to eliminate the direct coupling) and/or cancelling the interference on the receive signal caused by the transmit signal. Types of signal isolation and cancellation techniques generally include propagation isolation, analog cancellation, and digital cancellation. Propagation isolation is used to ensure isolation of signals between transmit and receive antennas, generally by providing enough physical separation between the antennas to prevent direct coupling or environmental reflections of the signal(s). Analog cancellation uses delay, phase, and amplitude adjustments to combine an out-of-phase copy of the transmit signal with the receive signal. Digital cancellation implements channel modeling to remove the transmit signal from the received signal.

Such approaches tend to be more practical in large platforms which allow for large physical spacing between the transmit and receive antennas but are often not possible in small platforms where the antennas tend to be relatively close together (e.g., within a common housing having a handheld form factor). Moreover, coupling between transmitter and receiver antennas of a STAR system is often complicated and includes multiple coupling paths, which gives rise to a number of non-trivial issues. As such, many communication systems, notably those seeking 5G capabilities (such as small form factor mobile devices), require significant improvements in efficiency to meet increasingly challenging system requirements.

DETAILED DESCRIPTION

Techniques are disclosed for self-interference signal cancellation. In accordance with an embodiment of the present disclosure, a hybrid self-interference cancellation (SIC) circuit that includes a tunable time domain filter in series with a tunable frequency domain filter and is configured to be operatively coupled to a transmitter and a receiver. For example, antennas of the transmitter and the receiver may be in close proximity to each other, increasing the likelihood of self-interference when simultaneously transmitting and receiving signals. The tunable time domain filter is configured to generate a time-domain multipath cancellation signal (e.g., using a time delay) based on a first radio signal transmitted by the transmitter at a first frequency while the receiver is receiving a second radio signal at a second frequency. The first and second frequencies can be the same or different and have similar or different power levels at the antennas. The tunable frequency domain filter is configured to generate a frequency-domain cancellation signal (e.g., using a notch filter) based on the first radio signal while the receiver is receiving the second radio signal. In some embodiments, the tunable time domain filter includes an analog finite-impulse response FIR filter for time-domain cancellation followed in series by a resonator section having one or more cascaded resonators configured as tunable (variable) bandstop, bandpass, or allpass filters for frequency-domain cancellation. Numerous configurations will be appreciated in light of this disclosure.

General Overview

Figure 1:
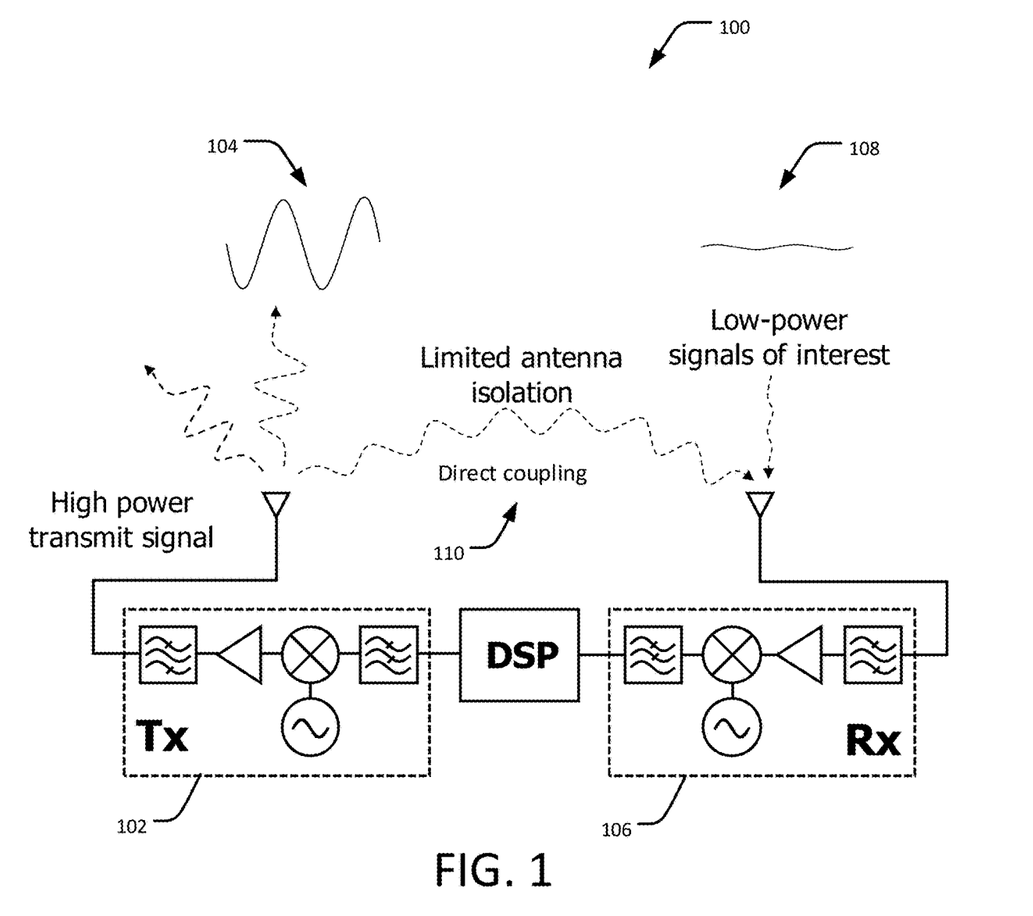
FIG. 1 shows a schematic diagram of a communication system configured for STAR operation and that is susceptible to self-interference.
Figure 2:
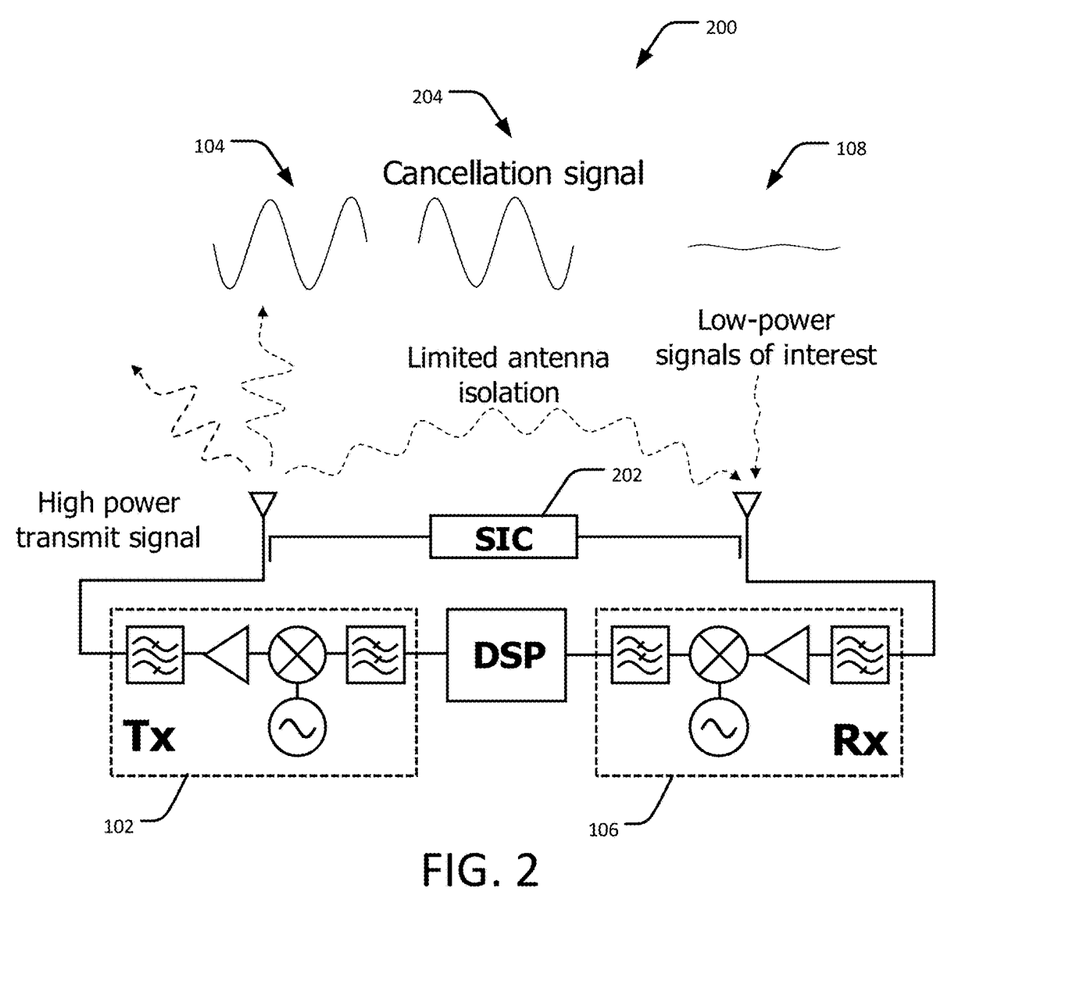
FIG. 2 is a schematic diagram of a communication system configured for STAR operation and including a self-interference cancellation (SIC) circuit.
Figure 3:
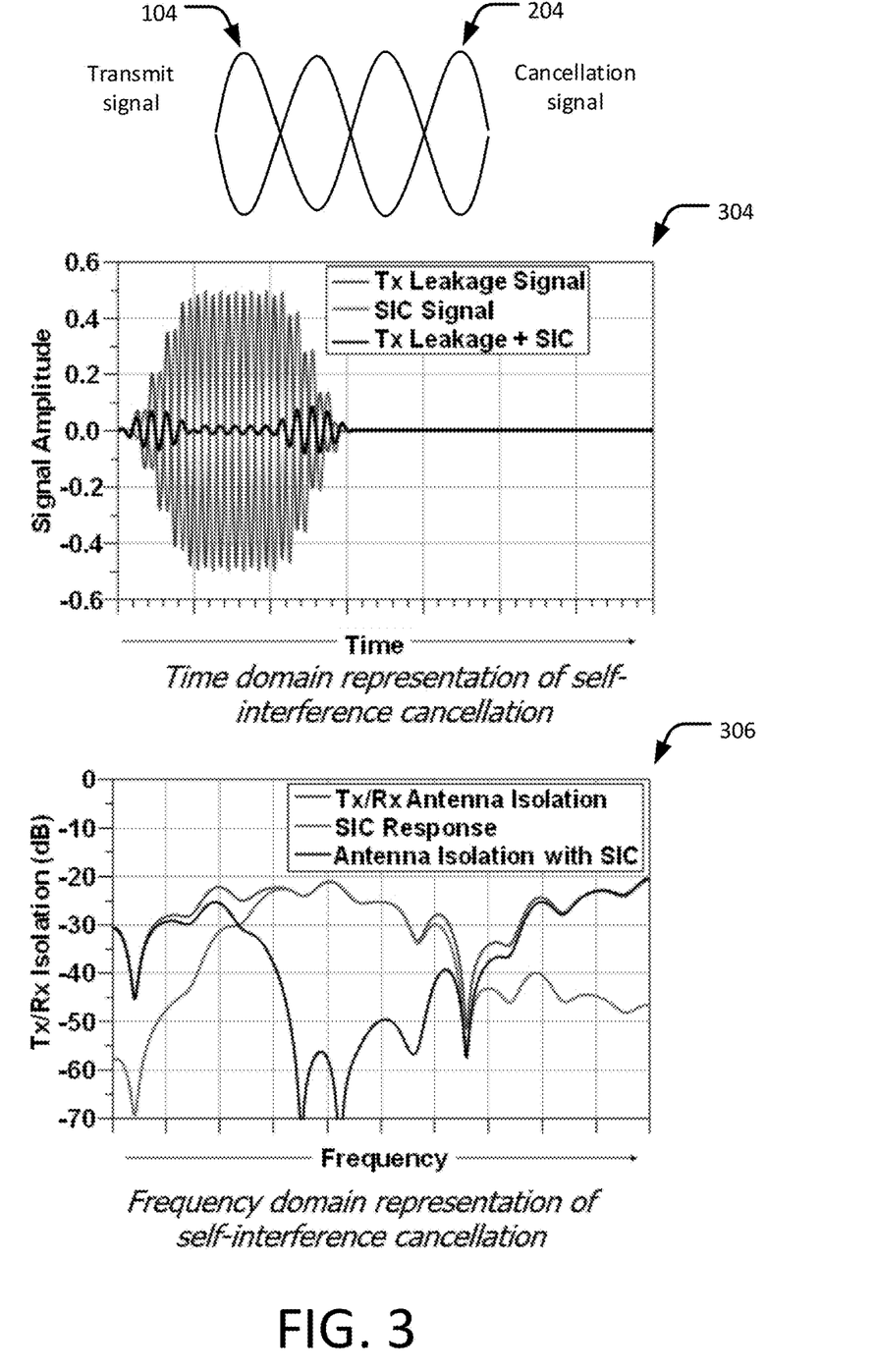
FIG. 3 shows example transmit and cancellation signals as well as a time domain representation of those signals and a frequency domain representation of those signals.
Figure 4:
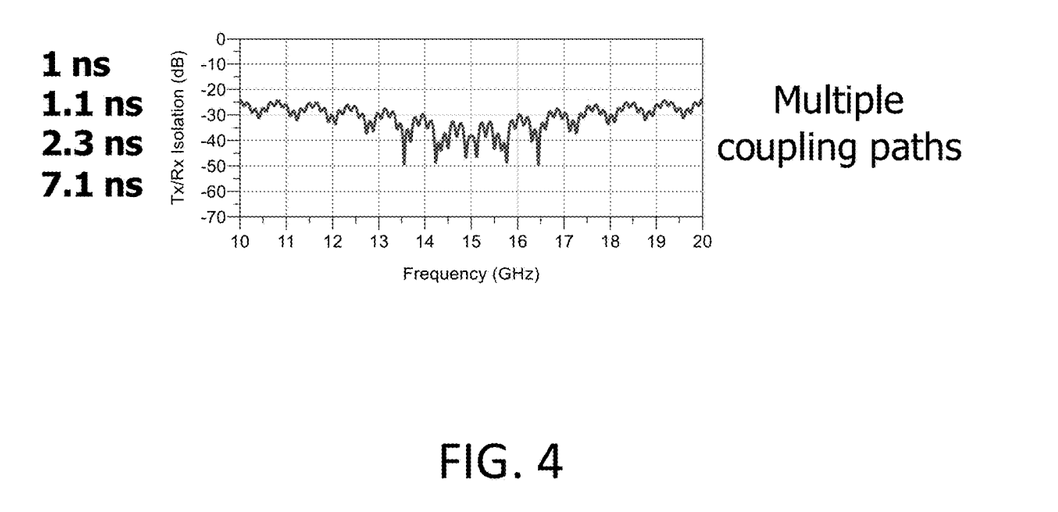
FIG. 4 demonstrates one challenging aspect of self-interference cancellation, and in particular shows an example of how coupling between transmitter and receiver antennas of a STAR system is often complicated and includes multiple coupling paths.

As previously noted, there are several non-trivial issues associated with STAR operation in wideband RF systems (e.g., channels using more than about 25 kHz), including providing the ability to listen to one signal at a given frequency or within a given frequency bandwidth while simultaneously jamming another signal at the same or similar frequencies. As an example, FIG. 1 shows a schematic diagram of a communication system 100 configured for STAR operation on a small platform where antennas for the transmitter 102 of a high power transmit signal and the receiver 106 of a low power signal of interest are close together (e.g., less than approximately one-quarter of the wavelength of the lowest frequency transmit and/or receive signals) and where the receiver 106 is configured to receive a receive signal 108 while the transmitter 102 is transmitting a transmit signal 104 in approximately the same time frame and in one example is simultaneously. The system is susceptible to self-interference in that leakage of the transmit signal 104 interferes with the receive signal 108 through direct coupling 110 between the transmit and receive antennas due to the close proximity of the antennas to each other and the closeness of the transmit and receive frequencies (i.e., self-interference increases as an inverse function of the distance between frequencies). Signal interference can also be caused by body reflections and surface waves between the antennas, or via environmental reflections of the transmit signal 104 back to the receiver 106. FIG. 2 is a schematic diagram of a self-interference cancellation (SIC) circuit 202 configured to reduce self-interference. As can be seen, the SIC circuit 202 is coupled between the antennas of the transmitter 102 and the receiver 106. In operation, a small amount of the transmit signal 104 is coupled off of the transmitter 102, processed by the SIC circuit 202, and injected into the receiver 106. The SIC circuit 202 generates a cancellation signal 204 based on the transmit signal 104 by adjusting the amplitude and phase of the transmit signal 104 so that the cancellation signal 204 injected into the receiver 106 is equal in amplitude but opposite in phase (for example, 180 degrees out of phase) to the transmit signal 104 (or a portion of the transmit signal), such as shown in FIG. 3, which effectively cancels the transmit signal 104 at the receiver 106 for the received signals of interest. The SIC circuit 202 is configured to match the frequency-dependent amplitude and phase variation of the native coupling paths between the transmit and receive antennas, over a relatively broad frequency range, so as to achieve broadband cancellation. Unfortunately, the transmit-receive coupling characteristics often have complex and unpredictable frequency dependencies due to the antenna structures and multipath reflections which are often encountered when the antennas are mounted onto a real platform. For example, when multiple coupling paths are present between transmit and receive antennas, amplitude and phase coupling between the transmitter 102 and the receiver 106 can vary significantly, such as shown in FIG. 4. Therefore, such conventional SIC devices may necessitate a large number of components for cancelling all of the antenna coupling paths since actual multipath delays are unknown ahead of time. In addition, due to their size, these components can be impractical in small form factors.

Hybrid SIC Circuit Architecture

Figure 5A:
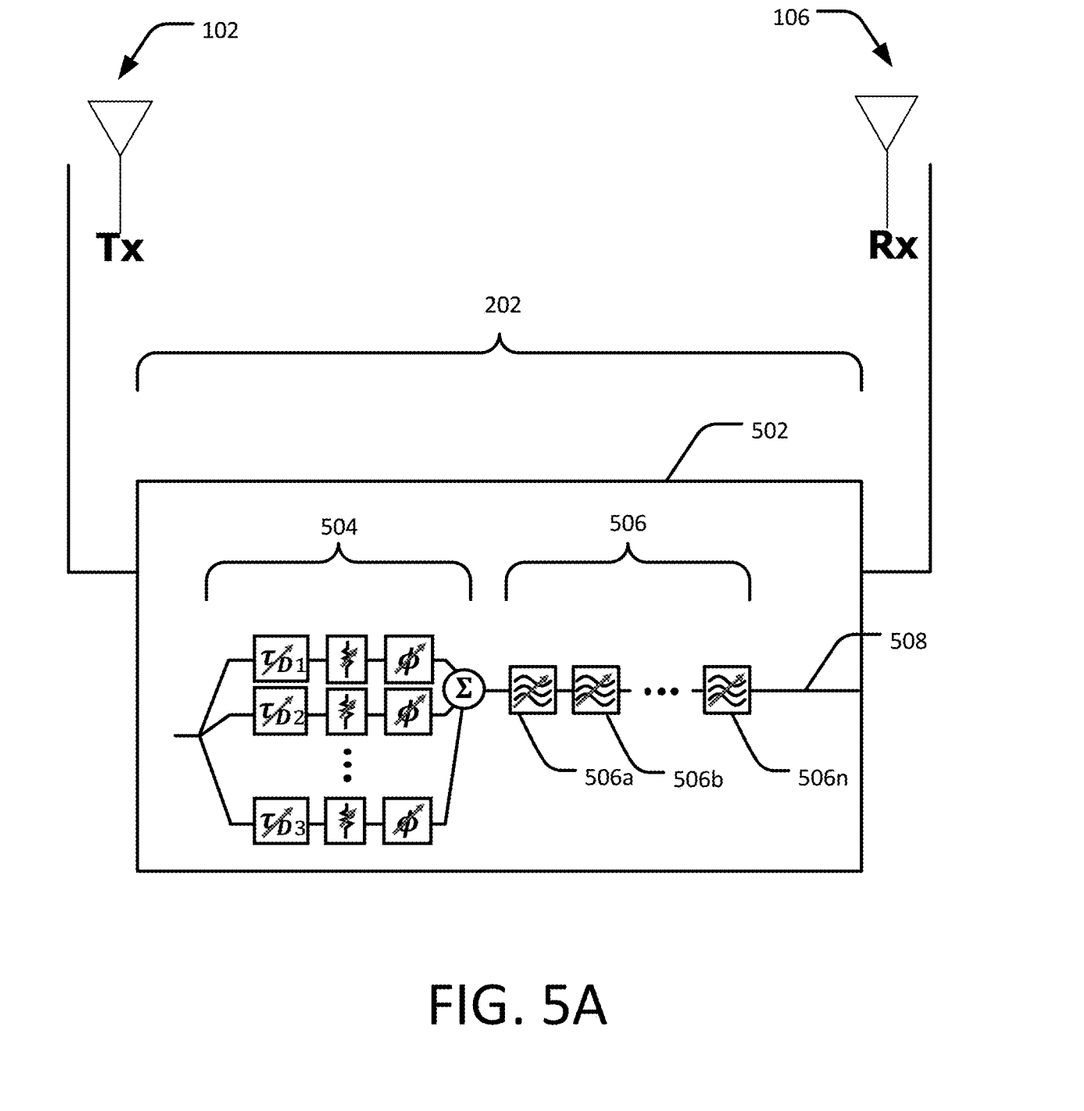
FIG. 5A is a schematic diagram of an example hybrid time-domain/frequency-domain SIC circuit, in accordance with an embodiment of the present disclosure.

FIG. 5A is a schematic diagram of an example hybrid time-domain/frequency-domain SIC circuit 502, in accordance with an embodiment of the present disclosure. The SIC circuit 502 is configured to be operatively coupled to the transmitter 102 and the receiver 106. For example, antennas of the transmitter 102 and the receiver 106 may be in close proximity to each other, increasing the likelihood of self-interference when simultaneously transmitting and receiving signals. The SIC circuit 502 includes a tunable time domain filter 504 in series with a tunable frequency domain filter 506. The tunable time domain filter 504 is configured to generate a time-domain multipath cancellation signal based on a first radio signal transmitted by the transmitter 102 at a first frequency while the receiver 106 is receiving a second radio signal at a second frequency. The first and second frequencies can be the same or different and have similar or different power levels at the antennas. The tunable frequency domain filter 506, which is in series with the tunable time domain filter 504, is configured to generate a frequency-domain cancellation signal based on the first radio signal while the receiver is receiving the second radio signal. In the time domain, the SIC circuit 502 generates a summation of two out-of-phase cancellation signals, which cancel each other, such as shown in FIG. 3 at 304. In the frequency domain, the SIC circuit 502 increases the isolation between the transmit and receive (Tx/Rx) antennas in regions where the SIC circuit 502 response closely matches the native transmit-receive coupling response (both amplitude and phase), such as shown in FIG. 3 at 306.

In some embodiments, the tunable time domain filter 504 includes an analog FIR filter for time-domain cancellation followed in series by the tunable frequency domain filter 506 such as a resonator section having one or more cascaded resonators 506a, 506b, . . . , 506n configured as tunable (variable) bandstop, bandpass, or allpass filters for frequency-domain cancellation. The FIR filter 504, in an embodiment, has one path, or "tap," that provides variable delay, phase, and attenuation. It will be understood that more taps can be used, depending on the exact use case. In some embodiments, at least two parallel paths, or "taps," can be used. If more than one path is present, the FIR section 504 is designed to match the strongest coupling paths between the antennas of the transmitter 102 and the receiver 106. These coupling paths are generally relatively well-known ahead of time, and thus the bandstop filters in the resonator section 506 do not have as stringent tuning requirements as the general case of FIG. 1. The resonators 506a, 506b, . . . , 506n are tunable in frequency and quality factor by use of tunable capacitors and resistors. The resonators 506a, 506b, . . . , 506n are coupled to the main signal path 508 with tunable capacitors, which enable tunable bandwidth. In some embodiments, the SIC circuit 502 yields, for example, about 20 dB of cancellation with a 120 MHz bandwidth centered at 2.4 GHz.

Figure 5B:
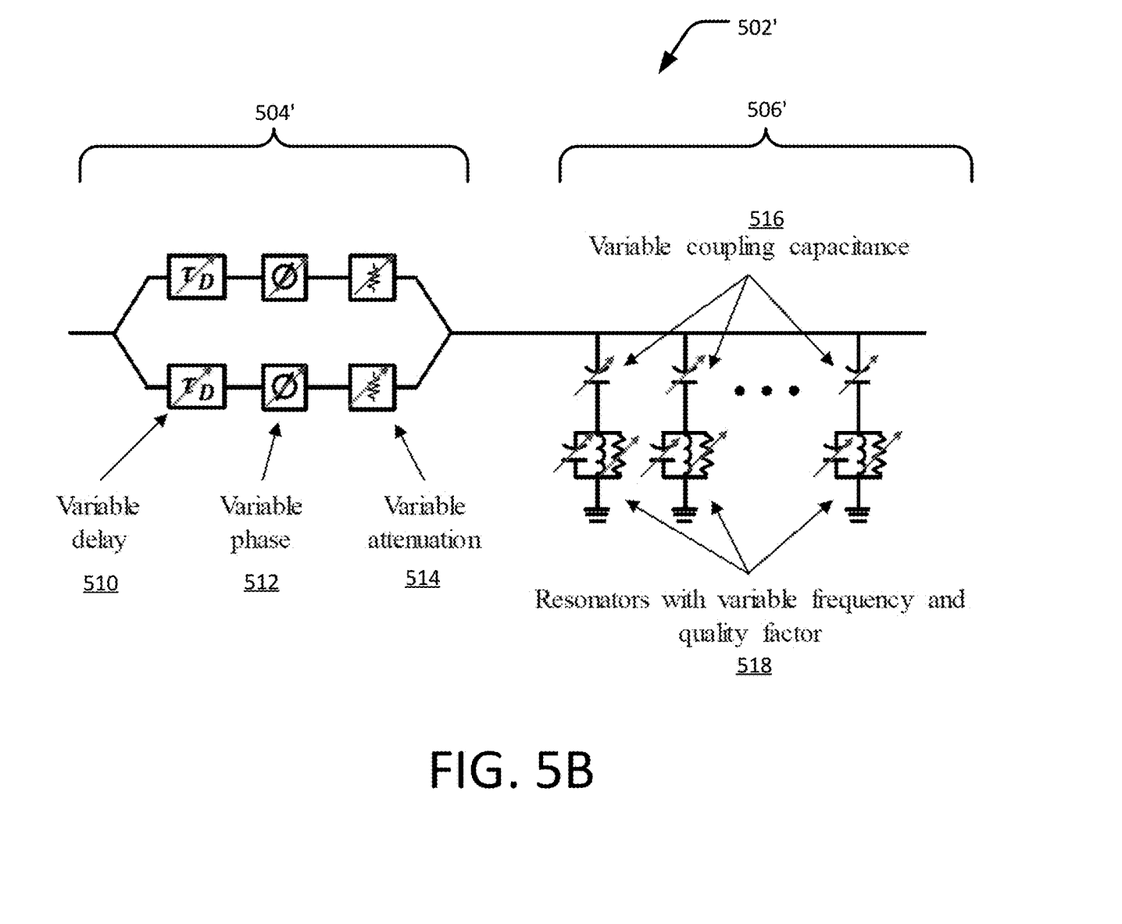
FIG. 5B is a schematic diagram of another example hybrid time-domain/frequency-domain SIC circuit, in accordance with an embodiment of the present disclosure.

FIG. 5B is a schematic diagram of another example hybrid time-domain/frequency-domain SIC circuit 502', in accordance with an embodiment of the present disclosure. The SIC circuit 502' includes a tunable time domain filter 504' in series with a tunable frequency domain filter 506'. The tunable time domain filter 504' includes one or more variable delay components 510, one or more variable phase components 512, and/or one or more variable attenuation components 514, each of which can be tuned to vary delay in time of the signal passing through the filter 504'. It will be understood that the number and arrangement of the components 510, 512, 514 can be altered from the disclosed examples. For example, the tunable time domain filter 504' can have any number of parallel paths (one or more) and that one or more of the components 510, 512, 514 can be arranged in different orders and/or in different numbers than shown. The tunable time domain filter 504' is configured to generate a time-domain multipath cancellation signal based on a first radio signal transmitted by the transmitter 102 at a first frequency while the receiver 106 is receiving a second radio signal at a second frequency (see FIG. 5A). The first and second frequencies can be the same or different and have similar or different power levels at the antennas. The tunable frequency domain filter 506' includes one or more variable coupling capacitance components 516 and one or more resonators with variable frequency and quality factor components 518, each of which can be tuned to vary delay in frequency of the signal passing through the filter 506'. It will be understood that the number and arrangement of the components 516, 518 can be altered from the disclosed examples. For example, the tunable frequency domain filter 506' can have any number of parallel paths (one or more) and that one or more of the components 516, 518 can be arranged in different orders and/or in different numbers than shown. The tunable frequency domain filter 506', which is in series with the tunable time domain filter 504', is configured to generate a frequency-domain cancellation signal based on the first radio signal while the receiver is receiving the second radio signal (see FIG. 5A). In the time domain, the SIC circuit 502' generates a summation of two out-of-phase cancellation signals, which cancel each other, such as shown in FIG. 3 at 304. In the frequency domain, the SIC circuit 502' increases the isolation between the transmit and receive (Tx/Rx) antennas in regions where the SIC circuit 502' response closely matches the native transmit-receive coupling response (both amplitude and phase), such as shown in FIG. 3 at 306.

In some embodiments, the tunable time domain filter 504' includes an analog FIR filter for time-domain cancellation followed in series by the tunable frequency domain filter 506' such as a resonator section having one or more cascaded resonators configured as tunable (variable) bandstop, bandpass, or allpass filters for frequency-domain cancellation. The FIR filter 504', in an embodiment, has one path, or "tap," that provides variable delay, phase, and attenuation. It will be understood that more taps can be used, depending on the exact use case. In some embodiments, at least two parallel paths, or "taps," can be used. If more than one path is present, the FIR section 504' is designed to match the strongest coupling paths between the antennas of the transmitter 102 and the receiver 106. These coupling paths are generally relatively well-known ahead of time, and thus the bandstop filters in the resonator section 506' do not have as stringent tuning requirements as the general case of FIG. 1. The resonators 518 are tunable in frequency and quality factor by use of tunable capacitors and resistors. The resonators 518 are coupled to the main signal path with tunable capacitors, which enable tunable bandwidth. In some embodiments, the SIC circuit 502' yields, for example, about 20 dB of cancellation with a 120 MHz bandwidth centered at 2.4 GHz.

In some examples, the variable delay components 510 can generate a delay between 0.05 and 15 nanoseconds. In some examples, the variable phase components 510 can generate a variable phase between 0 and 360 degrees. In some examples, the variable attenuation components 514 can generate an attenuation between 0 and 20 dB. In some examples, the variable coupling capacitance components 516 can generate a capacitance between 50 femtofarads and 10 picofarads. In some examples, the resonators 518 have a variable frequency between 0.1 and 1.0 GHz, and a variable quality factor between 5-100. However, it will be appreciated that all of these values are dependent on the details of the specific application (e.g., frequency of operation, environment surrounding antennas, required power handling level, etc.). A design providing the same basic functionality but tailored for a different use case could have values that differ by an order of magnitude from those listed in these examples.

Finite-Impulse Response Filter

Figure 6:
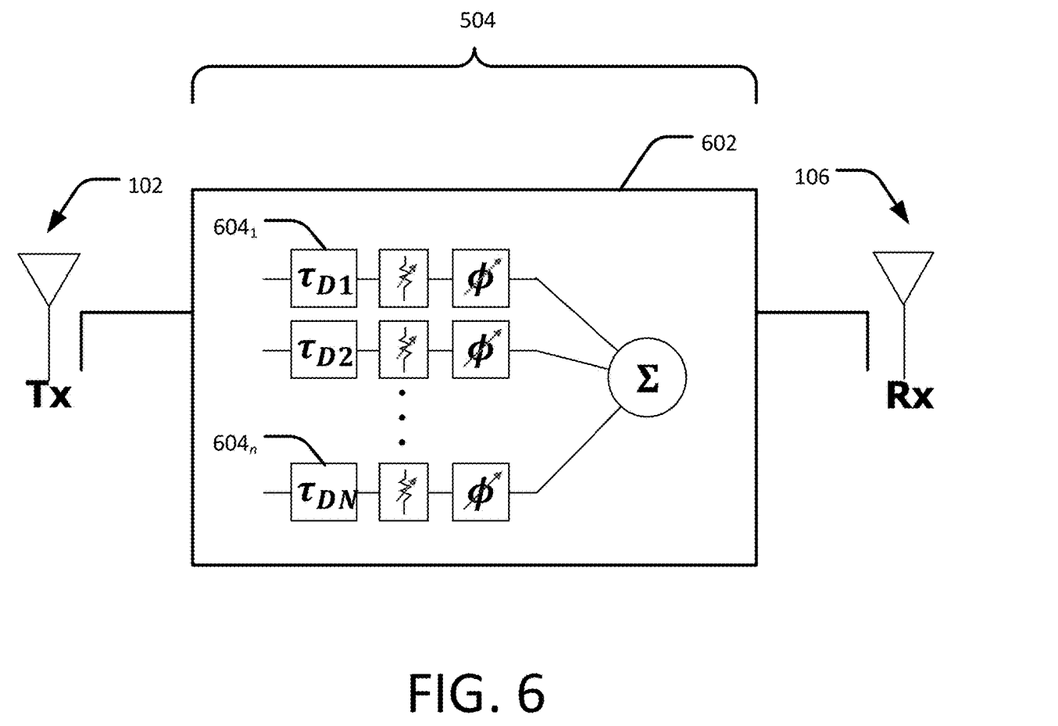
FIG. 6 is a schematic diagram of an example SIC circuit implemented as an analog finite-impulse response (FIR) filter, in accordance with an embodiment of the present disclosure.

FIG. 6 is a schematic diagram of an example SIC circuit where the tunable time domain filter 504 is implemented as an analog finite-impulse response (FIR) filter 602, in accordance with an embodiment of the present disclosure. The FIR filter 602 can have one path, or "tap," or multiple parallel paths $604_1$-$604_n$, or "taps," each of which has different time delay and the amplitude of which is, in some examples, weighted by an attenuator or amplifier. To emulate the characteristics of the transmit-receive antenna coupling, the time delays in one example will closely match the delays associated with the various antenna coupling paths to produce time-domain cancellation effects. The amount of cancellation achievable in this approach depends on the ability to match the amplitude and phase of the self-interference. Some conventional systems cannot achieve perfect matching due to imperfections in device performance and quantization error of tuning steps. These issues compound over frequency, where the match is maintained at every frequency point in the band of interest. Combining multiple delay taps achieves more complex canceller response characteristics and better matches nonlinear channels to account for additional self-interference paths. Thus, because the time delays are generally unknown before a signal is received, the FIR filter 602 may have a large number of taps 604 (often several dozen) covering a wide range of delays. However, in conventional arrangements, a large number of taps causes analog FIR-based SIC circuits to be large, bulky, and lossy because the required delay values (often several nanoseconds) require very long transmission line structures.

In some embodiments, the FIR filter 602 can be implemented using an Analog Devices HMC472ALP4E digital attenuator, with 0.5 dB to 31.5 dB attenuation in 0.5 dB steps, and a MACOM MAPS-010164 digital phase shifter, with 360° phase tuning in 5.2° steps. This configuration matches the non-linear channels within 0.25 dB and 2.8° corresponding to 24.8 dB of cancellation at a single point. In addition, using delay maintains the match over frequency. Some embodiments implement coarse delay adjustments from 41 ps to 211 ps with an Analog Devices HMC321ALP4E SP8T switch, and fine delay adjustment with a bank of delay lines on each tap. Balancing the delay match and total phase shift through the canceller enables matching of self-interference and canceller responses over a wide bandwidth.

While delay taps can be used to match ideal channels over wide bandwidths, they have trouble maintaining match when considering the variations of practical self-interference responses. It has been observed that multipath interference results in periodic notches in the frequency domain of the signal. For self-interference cancellation, the channel response can be matched over the relevant bandwidth in the frequency domain rather than over all possible frequencies. Thus, in accordance with embodiments of the present disclosure, it is appreciated that cascaded bandstop filters, such as the resonators 506a, 506b, . . . , 506n of FIG. 5A, can also create periodic notches that approximate the multipath response over a certain bandwidth to provide frequency-domain cancellation of the transmit signal 104. It is noted that adding additional delay taps 604 (n>1) achieves similar improvements as notch filters, but time delays are not as well suited as notch filters for precision changes in the canceller response. Additional delay taps also come at the cost of additional power splitting, which must be achieved by reducing transmit power with increased coupling from the transmit path or additional splitting after coupling, reducing usable power in each tap. In some embodiments, two delay taps 604 (n=2) can be used in conjunction with one or more bandstop filters in series, thereby limiting the number of delay taps needed for generating a cancellation signal.

Resonators

Figure 7:
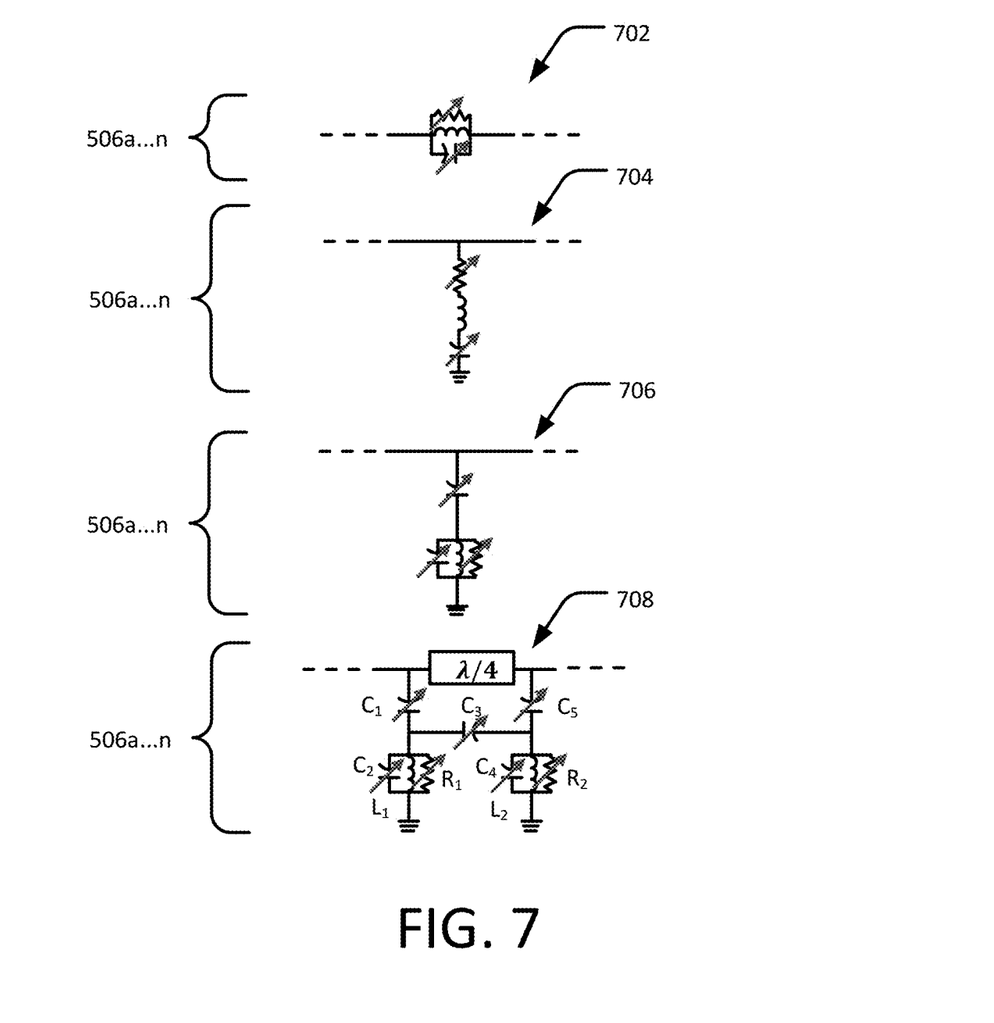
FIG. 7 shows several example resonators, in accordance with various embodiments of the present disclosure.

FIG. 7 shows several example resonators 506a, 506b, . . . , 506n, in accordance with various embodiments of the present disclosure. Each resonator 506a, 506b, . . . , 506n can, for example, include any microwave resonator 702 alone or in combination with lumped elements, such as an inductor and capacitor 704, a distributed transmission line (e.g., a microstrip) 706, and/or a cavity resonator 708 (e.g., a waveguide) to provide a tunable bandstop filter. In some examples, the cavity resonator 708 can have a 0.1-1.0 GHz design in which $C_1=C_5=0.05$-10 pF, $C_2=C_4=5$-50 pF, $C_3=0.05$-10 pF, $L_1=L_2=5$-50 nH, and $R_1=R_2=100$-10,000 ohms. The tunable resonators 506a, 506b, . . . , 506n allow the frequency response of the SIC circuit 502 to be tailored to match the transmit-receive antenna coupling characteristics over a given frequency range, adjusting for other coupling paths not addressed by the FIR filter 602 of FIG. 6. The resonators 506 (e.g., notch filters) can be implemented using a Peregrine Semiconductor PE64907 digitally tunable capacitor for both C1 and C2 with a 1 nH inductor. By leveraging the fine-tuning resolution of the two capacitors, this design is able to create notches from 1.8 GHz to 3.3 GHz with notches between 4 dB and 18 dB, with 210 tuning states between these bounds. This high degree of filter tuning allows for high flexibility and the ability to match a wide variety of self-interference response characteristics.

In some conventional applications of bandstop filters (inserted in an RF transmit or receive chain to reject a narrow band of frequencies), group delay is not an important parameter. This is because the signals within the stopband are undesired, and therefore the influence the filter has on their delay/phase is not critical. Group delay thus is not a parameter that is typically described or measured for bandstop filters. However, in accordance with various embodiments of the present disclosure, bandstop filters are used to selectively modify the amplitude and phase of the transfer function of the SIC circuit 502. The delay/phase characteristics are useful and important to precisely control the amplitude and phase of the transfer function of the SIC circuit 502. For example, in some embodiments, the tunable frequency domain filter 506 has one or more variable coupling elements, such as the variable capacitors connecting the resonators to each other and to the transmission line, and variable resonator quality factors, such as the variable resistor in a resistance-inductance-capacitance (RLC) resonator. This allows the group delay and the attenuation of each element in the tunable frequency domain filter 506 to be varied independently of each other within a certain range of values. This is in contrast to conventional frequency domain filters, which have static coupling coefficients and resonator quality factors. With a static filter configuration, it is not possible to vary the group delay and attenuation independently of each other. Static filters thus would not have the same utility for self-interference cancellation as a variable-coupling filter, regardless of the group delay characteristics of the static filters. For example, because different filter parameters are important for this use case, variable coupling and quality factor are provided to give greater control over these group delay characteristics. The variable coupling and quality factor provide benefit to the filter when used in accordance with various embodiments of this disclosure. For a bandstop filter used in a conventional manner, the variable coupling and quality factor would yield no benefit.

Figure 8:
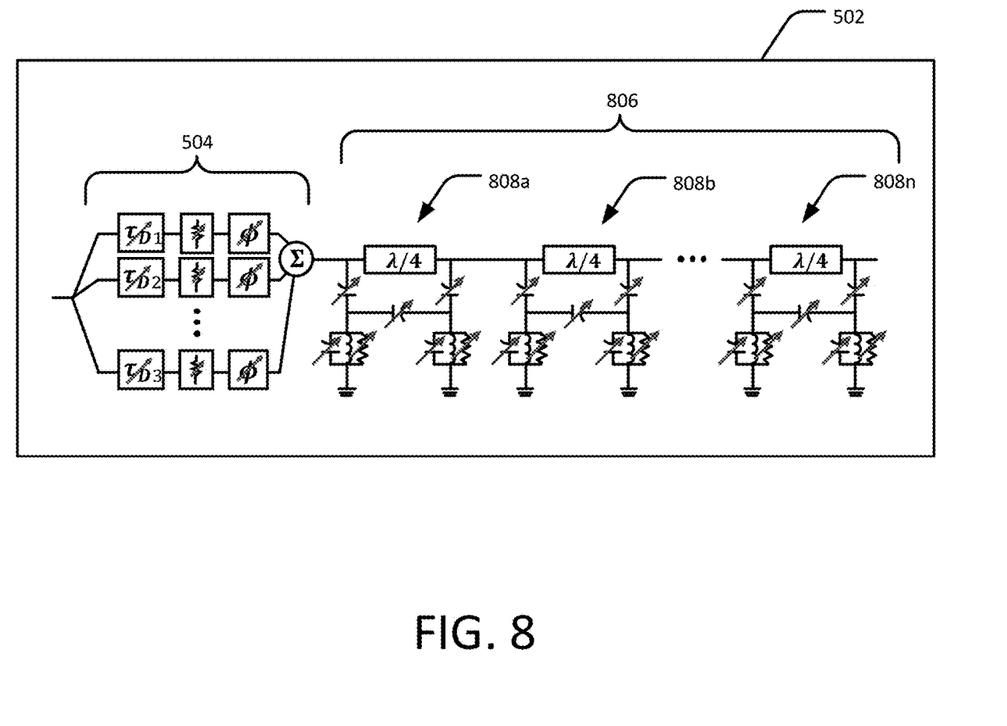
FIG. 8 shows an example cascading tunable cross-coupled two-pole bandstop filter that can be used in conjunction with the SIC circuit of FIG. 5A and/or FIG. 5B, in accordance with an embodiment of the present disclosure.

FIG. 8 shows an example cascading tunable cross-coupled two-pole bandstop filter 806 that can be used in conjunction with the SIC circuit 502 of FIG. 5A and/or the SIC circuit 502' of FIG. 5B, in accordance with an embodiment of the present disclosure. The tunable cross-coupled two-pole bandstop filter 806 includes multiple cascaded resonators 808a, 808b, 808n. In some examples, the cascaded resonators 808a-808b can have a 0.1-1.0 GHz design in which $C_1=C_5=0.05$-10 pF, $C_2=C_4=5$-50 pF, $C_3=0.05$-10 pF, $L_1=L_2=5$-50 nH, and $R_1=R_2=100$-10,000 ohms (also see resonator 708 in FIG. 7). The tunable cross-coupled two-pole bandstop filter 806 is widely reconfigurable and can semi-independently vary a narrowband group delay and attenuation in addition to a center frequency, as with some other types of bandstop filters. Cascading multiple filter sections 808a, 808b, . . . , 808n can be used to allow amplitude and phase to be shaped with multiple degrees of freedom.

Figure 9:
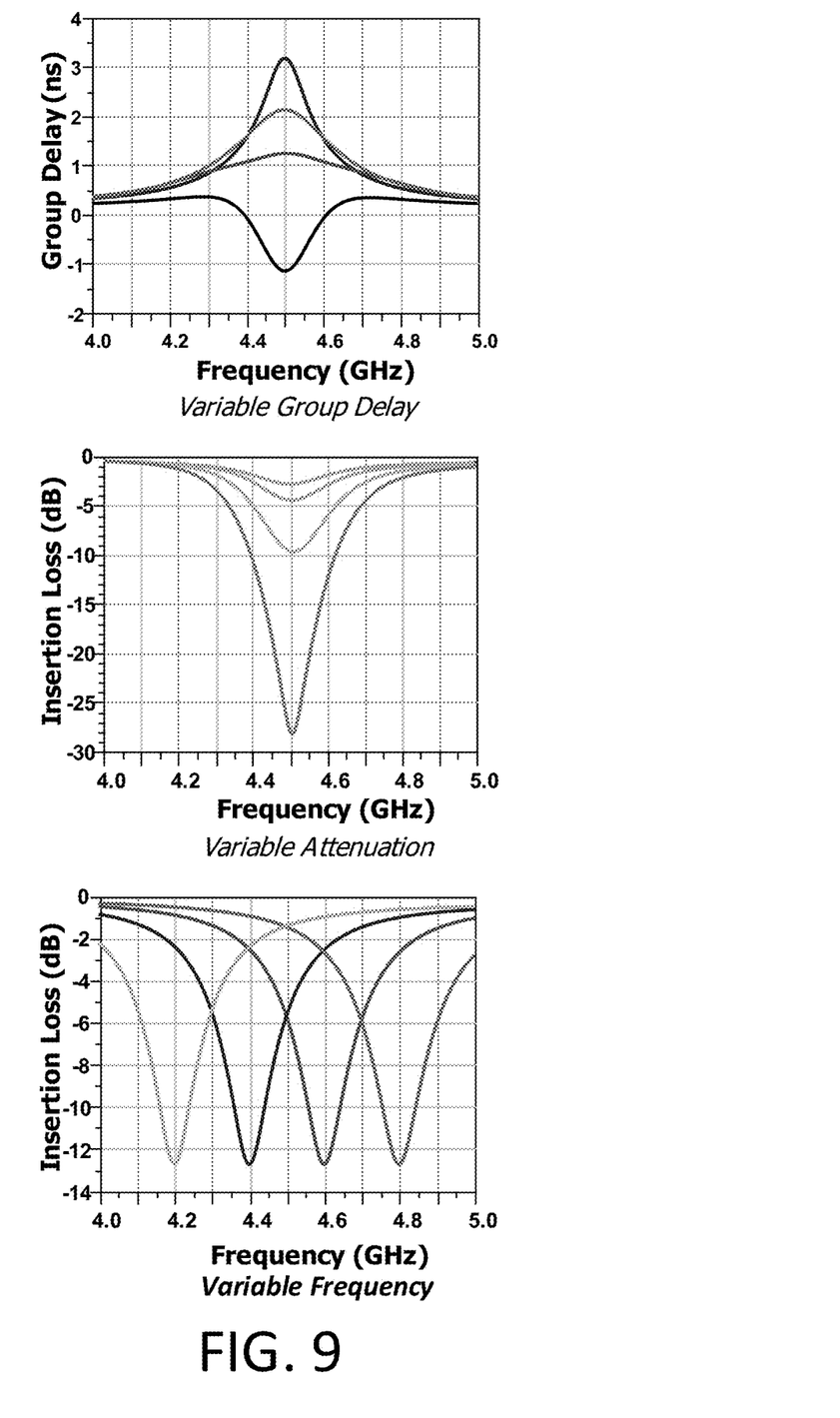
FIG. 9 shows example group delay for a variable group delay, insertion loss for a variable attenuation, and insertion loss for a variable frequency when using the tunable cross-coupled two-pole bandstop filter of FIG. 8, in accordance with an embodiment of the present disclosure.

FIG. 9 shows example group delay for a variable group delay, insertion loss for a variable attenuation, and insertion loss for a variable frequency when using the tunable cross-coupled two-pole bandstop filter of FIG. 8.

In contrast to the approach of FIG. 1, it is not necessary to match the delay of each non-dominant antenna coupling path with an identical delay path in the FIR filter 504. Instead, the frequencies and bandwidths of the resonators 808a, 808b, . . . , 808n can be reconfigured to match the response over a given frequency range. The SIC circuits 502 of FIGS. 5 and 8 are much smaller and lower-loss than the FIR filter-based approach of FIG. 6, since tunable resonators 506, 806 can be made very small and are compatible with integrated circuit technology. A typical on-chip tunable resonator is approximately 0.2 mm×0.2 mm, whereas a single tap of a FIR filter could contain a 100+ mm long transmission line to achieve the required delay.

The SIC circuit 502 of FIGS. 5 and 8 can be used in many applications, including any communications application, such as in-band full-duplex communications, small form factor applications with close antennas, cellular (e.g., 5G), wireless networking (e.g., WI-FI™), tactical military communication links, and various other types of radio communications.

Simulations

Figure 10:
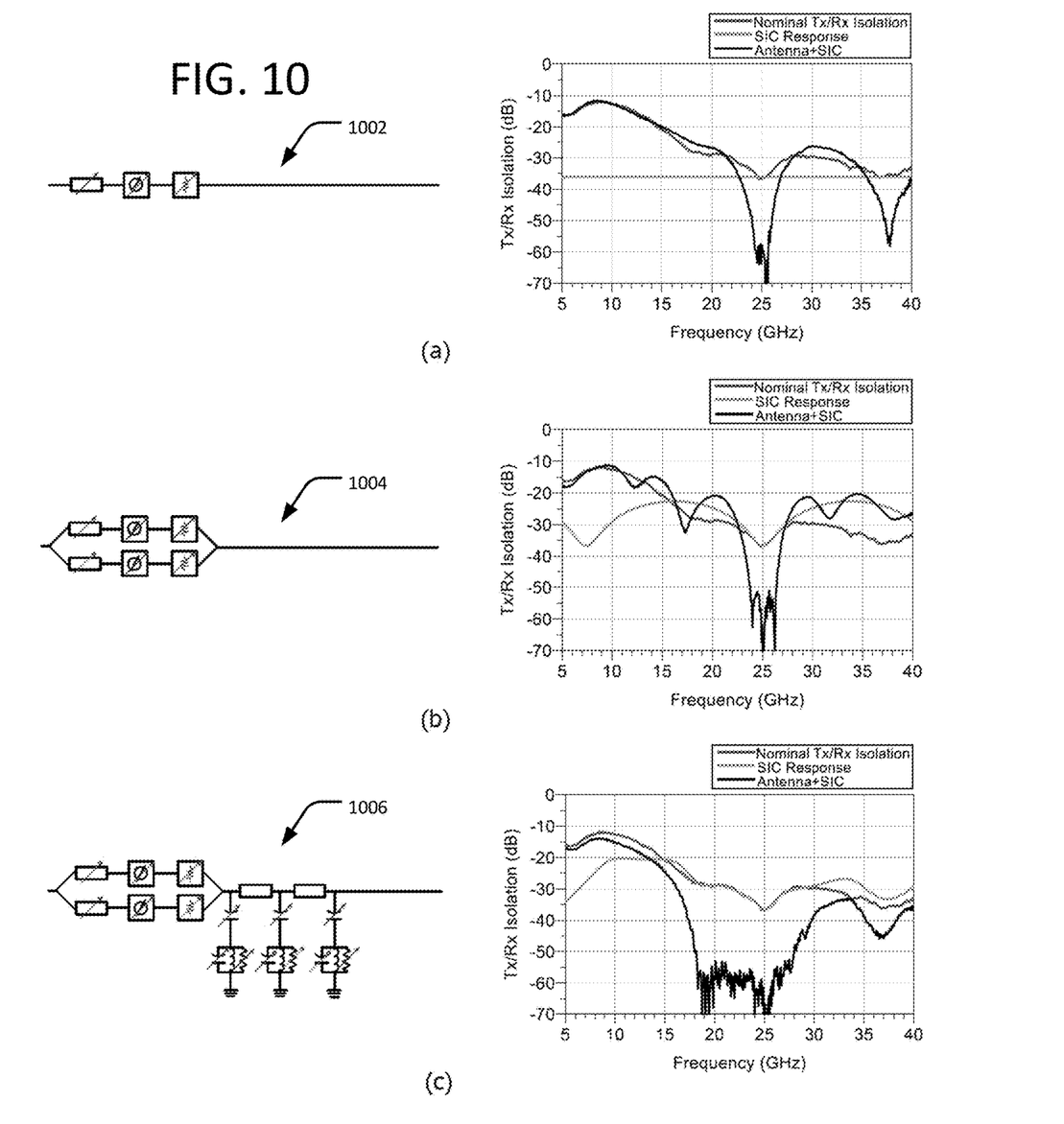
FIGS. 10a-c show simulations of various SIC circuits, in accordance with embodiments of the present disclosure.

FIGS. 10a-c show simulations of various SIC circuits 1002, 1004, 1006, in accordance with embodiments the present disclosure, when applied to measured antenna data, demonstrating the efficacy of the respective SIC circuits. FIG. 10(a) shows that a one-tap FIR circuit 1002 having a variable delay, variable phase shift, and variable attenuation, yields 50 dB of transmit-receive (Tx/Rx) isolation over a 2 GHz bandwidth. FIG. 10(b) shows that by using a two-tap analog FIR 1004, the 50-dB isolation bandwidth can be increased to 2.5 GHz. FIG. 10(c) shows that using a circuit 1006 with a two-tap FIR section followed by 3 bandstop resonators, the 50-dB isolation bandwidth is increased to 10 GHz.

Self-Interference Signal Cancellation Methodology

Figure 11:
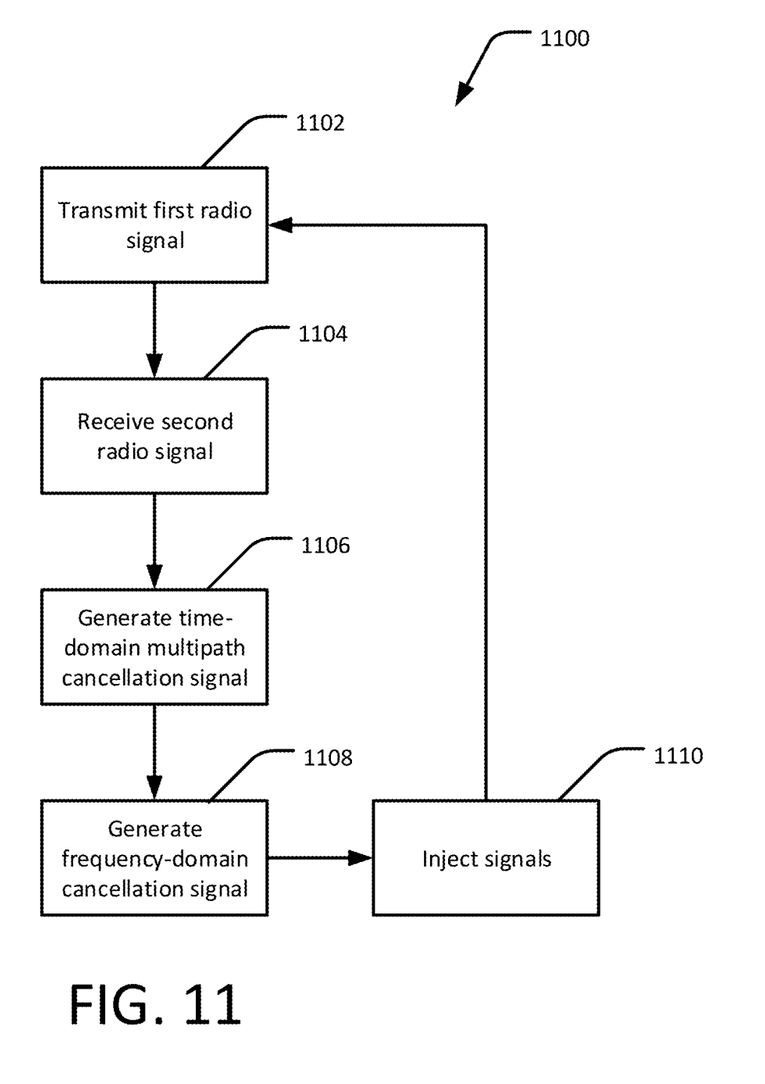
FIG. 11 is a flow diagram of a method of generating a self-interference cancellation signal, in accordance with an embodiment of the present disclosure.

FIG. 11 is a flow diagram of a method 1100 of generating a self-interference cancellation signal, in accordance with an embodiment of the present disclosure. The method 1100 can be implemented, for example, using the SIC circuit 202, 606 as variously described in this disclosure. The method 1100 includes transmitting 1102, by a transmitter, a first radio signal at a first frequency. The method 1100 further includes receiving 1104, by a receiver, a second radio signal at a second frequency. The method 1100 further includes generating 1106, using a tunable time domain filter operatively coupled to the transmitter and the receiver, a time-domain multipath cancellation signal based on the first radio signal while the receiver is receiving the second radio signal. The time-domain multipath cancellation signal can be generated, for example, using the FIR filter 604. The method 1100 further includes generating 1108, using a tunable frequency domain filter in series with the tunable time domain filter, a frequency-domain cancellation signal based on the first radio signal while the receiver is receiving the second radio signal. The frequency-domain cancellation signal can be generated, for example, using the tunable frequency domain filter 606 or the cascading tunable cross-coupled two-pole bandstop filter 806. The method 1100 further includes injecting 1110 the time-domain multipath cancellation signal and the frequency-domain cancellation signal into the receiver, thereby cancelling the self-interference of the second radio signal caused by the first radio signal.

In some embodiments, the tunable frequency domain filter includes a plurality of resonators arranged in series. In some embodiments, the tunable frequency domain filter includes at least one of a tunable bandstop filter, a tunable bandpass filter, and a tunable allpass filter. In some embodiments, the tunable frequency domain filter includes a cross-coupled two-pole bandstop filter. In some embodiments, the tunable frequency domain filter includes an inductor-capacitor (LC) resonator notch filter. In some embodiments, the tunable time domain filter includes a finite-impulse response (FIR) filter with one path or at least two parallel paths.

Additional Examples

Numerous embodiments will be apparent in light of the present disclosure, and features described herein can be combined in any number of configurations. An example embodiment provides a self-interference cancellation (SIC) circuit for coupling between a transmitter and a receiver. The SIC includes a tunable time domain filter configured to generate a time-domain multipath cancellation signal based on a first radio signal transmitted by the transmitter at a first frequency while the receiver is receiving a second radio signal at a second frequency; and a tunable frequency domain filter in series with the tunable time domain filter, the tunable frequency domain filter configured to generate a frequency-domain cancellation signal based on the first radio signal while the receiver is receiving the second radio signal. In some cases, the tunable frequency domain filter includes a plurality of resonators arranged in series. In some cases, the tunable frequency domain filter includes a tunable bandstop filter, a tunable bandpass filter, and/or a tunable allpass filter. In some cases, the tunable frequency domain filter includes a cross-coupled two-pole bandstop filter. In some cases, the tunable frequency domain filter includes an inductor-capacitor (LC) resonator notch filter. In some cases, the tunable time domain filter includes a finite-impulse response (FIR) filter with at least one path. In some cases, the first frequency is different from the second frequency.

Another example embodiment provides a communication system including a transmitter configured to transmit a first radio signal at a first frequency; a receiver configured to receive a second radio signal at a second frequency; and a self-interference cancellation circuit (SIC) operatively coupled between the transmitter and the receiver. The SIC includes a tunable time domain filter configured to generate a time-domain multipath cancellation signal based on the first radio signal while the receiver is receiving the second radio signal, and a tunable frequency domain filter in series with the tunable time domain filter, the tunable frequency domain filter configured to generate a frequency-domain cancellation signal based on the first radio signal while the receiver is receiving the second radio signal. In some cases, the tunable frequency domain filter includes a plurality of resonators arranged in series. In some cases, the tunable frequency domain filter includes a tunable bandstop filter, a tunable bandpass filter, and/or a tunable allpass filter. In some cases, the tunable frequency domain filter includes a cross-coupled two-pole bandstop filter. In some cases, the tunable frequency domain filter includes an inductor-capacitor (LC) resonator notch filter. In some cases, the tunable time domain filter includes a finite-impulse response (FIR) filter. In some cases, the first frequency is different from the second frequency.

Yet another example embodiment provides a method of self-interference cancellation. The method includes transmitting, by a transmitter, a first radio signal at a first frequency; receiving, by a receiver, a second radio signal at a second frequency; generating, using a tunable time domain filter operatively coupled between the transmitter and the receiver, a time-domain multipath cancellation signal based on the first radio signal while the receiver is receiving the second radio signal; generating, using a tunable frequency domain filter operatively coupled between the transmitter and the receiver and in series with the tunable time domain filter, a frequency-domain cancellation signal based on the first radio signal while the receiver is receiving the second radio signal; and injecting the time-domain multipath cancellation signal and the frequency-domain cancellation signal into the receiver. In some cases, the tunable frequency domain filter includes a plurality of resonators arranged in series. In some cases, the tunable frequency domain filter includes a tunable bandstop filter, a tunable bandpass filter, and/or a tunable allpass filter. In some cases, the tunable frequency domain filter includes a cross-coupled two-pole bandstop filter. In some cases, the tunable frequency domain filter includes an inductor-capacitor (LC) resonator notch filter. In some cases, the tunable time domain filter includes a finite-impulse response (FIR) filter with at least one path.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A self-interference cancellation (SIC) circuit for coupling between a transmitter and a receiver, comprising:
   a tunable time domain filter configured to generate a time-domain multipath cancellation signal based on a first radio signal transmitted by the transmitter at a first frequency while the receiver is receiving a second radio signal at a second frequency; and
   a tunable frequency domain filter in series with the tunable time domain filter, the tunable frequency domain filter configured to generate a frequency-domain cancellation signal based on the first radio signal while the receiver is receiving the second radio signal.

2. The circuit of claim 1, wherein the tunable frequency domain filter includes a plurality of resonators arranged in series.

3. The circuit of claim 1, wherein the tunable frequency domain filter includes at least one of a tunable bandstop filter, a tunable bandpass filter, and a tunable allpass filter.

4. The circuit of claim 1, wherein the tunable frequency domain filter includes a cross-coupled two-pole bandstop filter.

5. The circuit of claim 1, wherein the tunable frequency domain filter includes an inductor-capacitor (LC) resonator notch filter.

6. The circuit of claim 1, wherein the tunable time domain filter includes a finite-impulse response (FIR) filter with at least one path.

7. The circuit of claim 1, wherein the first frequency is different from the second frequency.

8. A communication system, comprising:
   a transmitter configured to transmit a first radio signal at a first frequency;
   a receiver configured to receive a second radio signal at a second frequency; and
   a self-interference cancellation circuit (SIC) operatively coupled between the transmitter and the receiver, the SIC including
      a tunable time domain filter configured to generate a time-domain multipath cancellation signal based on the first radio signal while the receiver is receiving the second radio signal, and
      a tunable frequency domain filter in series with the tunable time domain filter, the tunable frequency domain filter configured to generate a frequency-domain cancellation signal based on the first radio signal while the receiver is receiving the second radio signal.

9. The system of claim 8, wherein the tunable frequency domain filter includes a plurality of resonators arranged in series.

10. The system of claim 8, wherein the tunable frequency domain filter includes at least one of a tunable bandstop filter, a tunable bandpass filter, and a tunable allpass filter.

11. The system of claim 8, wherein the tunable frequency domain filter includes a cross-coupled two-pole bandstop filter.

12. The system of claim 8, wherein the tunable frequency domain filter includes an inductor-capacitor (LC) resonator notch filter.

13. The system of claim 8, wherein the tunable time domain filter includes a finite-impulse response (FIR) filter.

14. The system of claim 8, wherein the first frequency is different from the second frequency.

15. A method of self-interference cancellation, the method comprising:
   transmitting, by a transmitter, a first radio signal at a first frequency;
   receiving, by a receiver, a second radio signal at a second frequency;
   generating, using a tunable time domain filter operatively coupled between the transmitter and the receiver, a time-domain multipath cancellation signal based on the first radio signal while the receiver is receiving the second radio signal;
   generating, using a tunable frequency domain filter operatively coupled between the transmitter and the receiver and in series with the tunable time domain filter, a frequency-domain cancellation signal based on the first radio signal while the receiver is receiving the second radio signal; and
   injecting the time-domain multipath cancellation signal and the frequency-domain cancellation signal into the receiver.

16. The method of claim 15, wherein the tunable frequency domain filter includes a plurality of resonators arranged in series.

17. The method of claim 15, wherein the tunable frequency domain filter includes at least one of a tunable bandstop filter, a tunable bandpass filter, and a tunable allpass filter.

18. The method of claim 15, wherein the tunable frequency domain filter includes a cross-coupled two-pole bandstop filter.

19. The method of claim 15, wherein the tunable frequency domain filter includes an inductor-capacitor (LC) resonator notch filter.

20. The method of claim 15, wherein the tunable time domain filter includes a finite-impulse response (FIR) filter with at least one path.

* * * * *